J. E. KIRBERG.
MACHINE FOR MAKING BRAIDS AND TRIMMINGS.
APPLICATION FILED AUG. 14, 1908.

928,461.

Patented July 20, 1909.
6 SHEETS—SHEET 1.

Witnesses
L. Douville
P. F. Nagle

Inventor
Jakob E. Kirberg.
By Wiedersheim & Fairbanks
Attorneys

J. E. KIRBERG.
MACHINE FOR MAKING BRAIDS AND TRIMMINGS.
APPLICATION FILED AUG. 14, 1908.

928,461.

Patented July 20, 1909.
6 SHEETS—SHEET 2.

Fig. 2.

Witnesses

Inventor
Jakob E. Kirberg.
By Wiedersheim & Fairbanks
Attorneys

J. E. KIRBERG.
MACHINE FOR MAKING BRAIDS AND TRIMMINGS.
APPLICATION FILED AUG. 14, 1908.

928,461.

Patented July 20, 1909.
6 SHEETS—SHEET 3.

J. E. KIRBERG.
MACHINE FOR MAKING BRAIDS AND TRIMMINGS.
APPLICATION FILED AUG. 14, 1908.

928,461.

Patented July 20, 1909.
6 SHEETS—SHEET 5.

Witnesses
L. Douville
P. F. Nagle

Inventor
Jakob E. Kirberg,
By Wiedersheim & Fairbanks
Attorneys

J. E. KIRBERG.
MACHINE FOR MAKING BRAIDS AND TRIMMINGS.
APPLICATION FILED AUG. 14, 1908.

928,461.

Patented July 20, 1909.
6 SHEETS—SHEET 6.

UNITED STATES PATENT OFFICE.

JAKOB EMIL KIRBERG, OF PHILADELPHIA, PENNSYLVANIA, ASSIGNOR TO HENSEL-COLLADAY COMPANY, A CORPORATION OF PENNSYLVANIA.

MACHINE FOR MAKING BRAIDS AND TRIMMINGS.

No. 928,461.          Specification of Letters Patent.          Patented July 20, 1909.

Application filed August 14, 1908. Serial No. 448,510.

*To all whom it may concern:*

Be it known that I, JAKOB EMIL KIRBERG, a citizen of the United States, residing in the city and county of Philadelphia, State of Pennsylvania, have invented a new and useful Improvement for Making Braids and Trimmings, which improvement is fully set forth in the following specification.

My invention relates to improvements in brading machines and consists of means whereby certain of the racers or bobbin-holders may be caused to remain stationary, for a predetermined length of time, while other of the racers or bobbin-holders are continually in motion when the machine is in operation.

It also consists of means for bringing the stationary racers or bobbin-holders into action when desired.

It further consists of novel details of construction all as will be, hereinafter fully set forth.

Similar numerals of reference indicate corresponding parts in the figures.

Referring to the drawings:—in order to produce certain designs or effects it is necessary that certain of the racers or carriers may be caused to remain stationary for a predetermined length of time, and again placed in motion for a predetermined length of time while all the other racers or carriers are in motion continuously. My invention is designed to accomplish this, and in the drawings I have shown a construction which I have found in practice operates successfully, but it will be evident that other instrumentalities may be employed, and the arrangement of the parts may be varied without departing from the spirit of my invention, and I do not therefore desire to be limited in every instance to the exact construction as herein shown and described, but desire to make such changes as may be necessary.

Figures 3, 4:
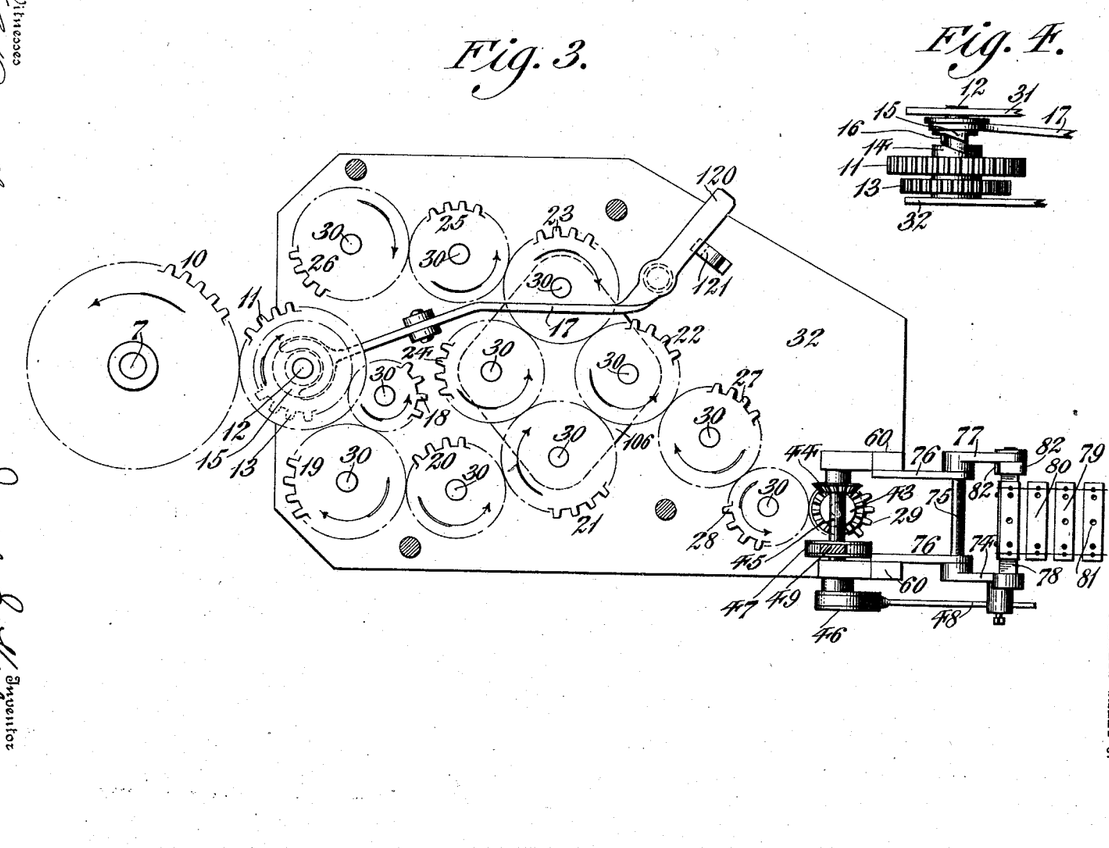
Fig. 3 is a plan view of certain gear wheels employed, and also of a portion of the jacquard mechanism.
Fig. 4 is a side elevation of certain portions of a clutch employed.

1 designates the frame of the machine in which is journaled the driving shaft 2 to which is secured the driving pulley 3 partly around which is passed the driving belt 4 to which motion may be imparted from any convenient source. Fast on the shaft 2 is a bevel gear wheel 5 that meshes with a bevel gear wheel 6 fast on the shaft 7 journaled in the bearings 8 and 9 that are part of the frame 1 of the machine. The shaft 7 has fast thereon a spur gear 10 that meshes with a gear wheel 11 loose on the shaft 12 and the object of which is hereinafter described. The shaft 12 has fast thereon a gear wheel 13, see Figs. 3 and 4, it being noted that said gear wheel 11 is provided with a clutch member 14 that co-acts with the clutch member 15 that is fitted on the shaft 12 and caused to rotate in unison therewith by reason of the feather 16 and may be moved up and down upon said shaft 12 by the lever 17 so as to bring said clutch member 15 into engagement with the clutch member 14 or else remove it therefrom as may be desired. The gear wheel 13 meshes with a pinion 18 whereby motion may be imparted to the train of gearing consisting of the wheels 19 to 29 both inclusive and for a purpose hereinafter described, it being observed that said gear wheels 19 to 29 are fitted on their respective shafts 30 whose ends are fitted in the plates 31 and 32 that are supported in the frame 1 of the machine.

The gear wheels 19, 20, 25 and 26 are secured to the slotted heads 33, 34, 35 and 36 respectively, which are known in the trade as drivers, while the gear wheels 21, 22, 23 and 24 have secured thereto the slotted heads 37, 38, 39 and 40, which are known in the trade as drivers, it being noted that these four latter are provided with recessed portions 41 for a purpose hereinafter described. The gear wheel 29 is fast on a shaft 42, see Figs. 1 and 3, and has connected therewith a bevel gear wheel 43 that is in mesh with the bevel gear wheel 44 so as to impart motion to the shaft 45 and consequently to the eccentrics 46 and 47 provided, respectively, with the rods 48 and 49 for a purpose hereinafter described. The gear wheel 27 is fast on its shaft 30 which is prolonged outwardly and has thereon a worm 50 that meshes with the worm wheel 51 fast on the shaft 52 so as to impart motion thereto and consequently to the train of gearing consisting of the wheels 53, 54, 55, 56 and 57 whereupon motion is imparted to the take-up rolls 58 in the usual manner, it being noted that said prolonged shaft 30 is provided with a crank 58$^\times$ whereby the machine may be operated by hand when desired. The gear wheels 51, 53, 54, 55, 56 and 57 are journaled in the standards 59 that are part of the frame 1 of the machine.

Figures 9, 10, 11, 12, 13, 14, 15:
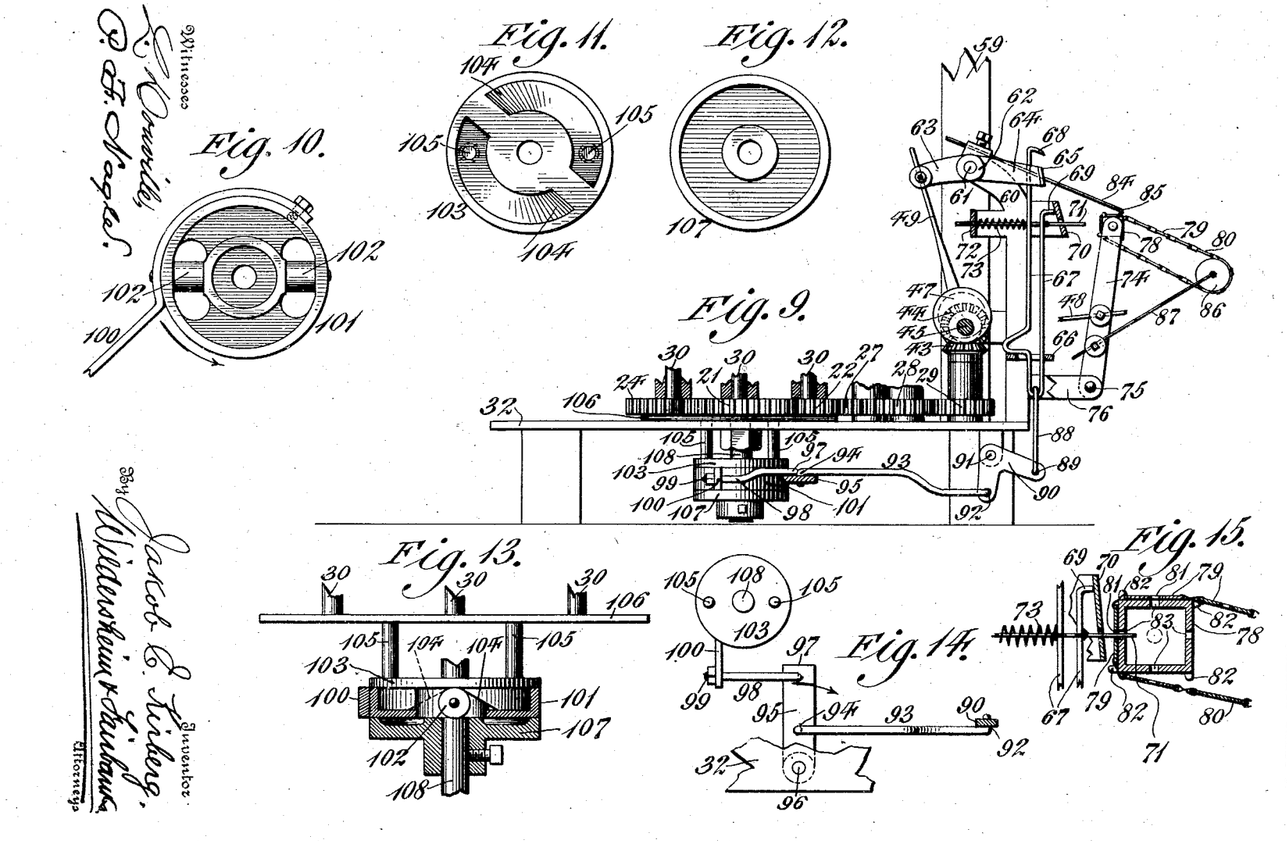
Fig. 9 is a side elevation, partly in section, of certain of the parts seen in Fig. 1.
Figs. 10, 11 and 12 are plan views of certain detached portions of the machine, on an enlarged scale.
Fig. 13 is a partial side elevation and partial vertical section of certain detached portions of the machine, on an enlarged scale.
Fig. 14 is a plan view of certain of the parts seen in Fig. 9.
Fig. 15 is a partial side elevation and partial vertical section of certain of the parts seen in Fig. 9, on an enlarged scale.
Figure 16:
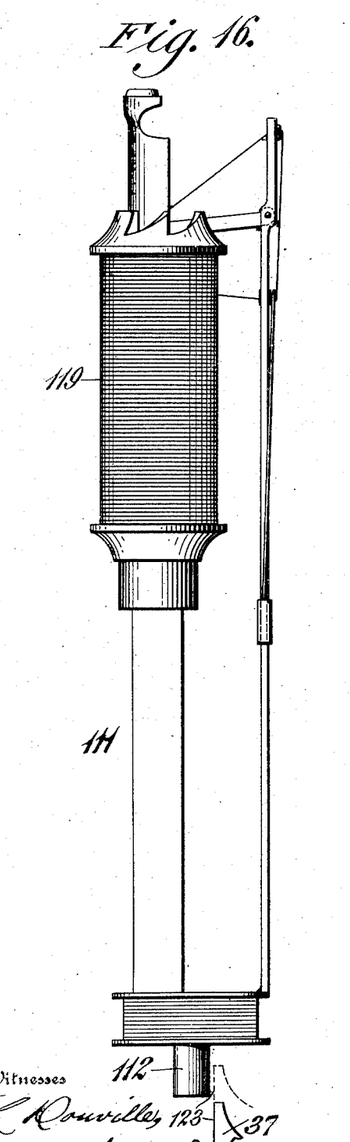
Figs. 16 and 17 are side elevations of yarn carriers employed, on an enlarged scale.

Journaled in standards 60, secured to the plate 32, is a shaft 61 on which is fitted a sleeve 62 provided with an arm 63 in which is fitted the upper portion of the eccentric rod 49 whereby a rocking motion may be imparted to said sleeve and consequently to the arms 64 that project therefrom, it being noted that said arms 64 support a blade 65 that rises and lowers in unison with the rocking motion of the sleeve 62. Supported by the standards 60 is a plate 66, see lower right hand portions of Figs. 1 and 9, upon which rests the U shaped rod 67 that is provided with the hooks 68 and 69 for a purpose hereinafter described. The point of the hook 69, normally, bears against the plate 70, which is on the standard 60, as best seen in Fig. 9.
The upper portions of the U shaped rod 67 are connected with a needle or rod 71 that is guided in the plates 70 and 72 so as to freely slide therein for a purpose hereinafter described, it being noted that said needle 71, is normally, retained in its forward position by the spring 73.

The eccentric rod 48 is connected to a rock arm 74 that is fast on a shaft 75 journaled in the brackets 76 that project from the standards 60. The shaft 75 has fast thereon a rock arm 77 similar to the arm 74 and these two latter support the journals of the jacquard cylinder 78 partly around which is passed the chain of cards 79 and 80, the former of which are perforated as at 81 while the latter are left solid for a purpose hereinafter described, it being noted that said perforations 81 are in alinement with the needle 71. The cylinder 78 is provided with projections 82, as best seen in Fig. 15, and with the perforations 83 the object of which is hereinafter described. The sleeve 62 has connected therewith one end of a rod 84 whose opposite end is provided with a hook 85 that is adapted to engage, at certain times, the projections 82 that lie in its path so as to rotate the cylinder 78 on its journals, for a purpose hereinafter described. The chain of cards 79 and 80 is passed partly around the roller 86 that is supported on a bracket 87 carried by rock arm 74. The lower portion of the U shaped rod 67 has connected thereto one end of a link 88 whose opposite end is secured at 89 to a bell crank lever 90, fulcrumed at 91 to any convenient point of the machine. Pivoted at 92 to the bell crank lever 90, see Fig. 14 is a link 93 whose opposite end is pivoted at 94 to a lever 95 fulcrumed at 96 to any convenient point of the machine. The lever 95 has pivoted thereto at 97 one end of a link 98 whose opposite end is secured at 99 to an arm 100 that projects from a casing 101 that has journaled therein the rollers 102, see Fig. 10. The casing 101 supports a disk 103 provided with the inclined faces 104, see Figs. 11 and 13, that co-act with the rollers 102 in a manner hereinafter described, it being noted that said disk 103 has rising therefrom the rods 105 that support a plate 106 as best seen in Fig. 13. The disk 103 seen in Fig. 11 is in an inverted position or, in other words it, is turned upside down so as to illustrate the inclined faces 104 on its underside. The plate 106 has secured thereto the shafts 30 on which are fitted the slotted heads 37, 38, 39 and 40, and also their respective gear wheels 21, 22, 23 and 24 so that said slotted heads and gear wheels rise and fall in unison with the up and down movements of the plate 106 as hereinafter described. The casing 101 rests upon a disk 107 secured to a rod 108 that is suspended from the plate 32 as will be understood from Figs. 1 and 9.

Figure 1:
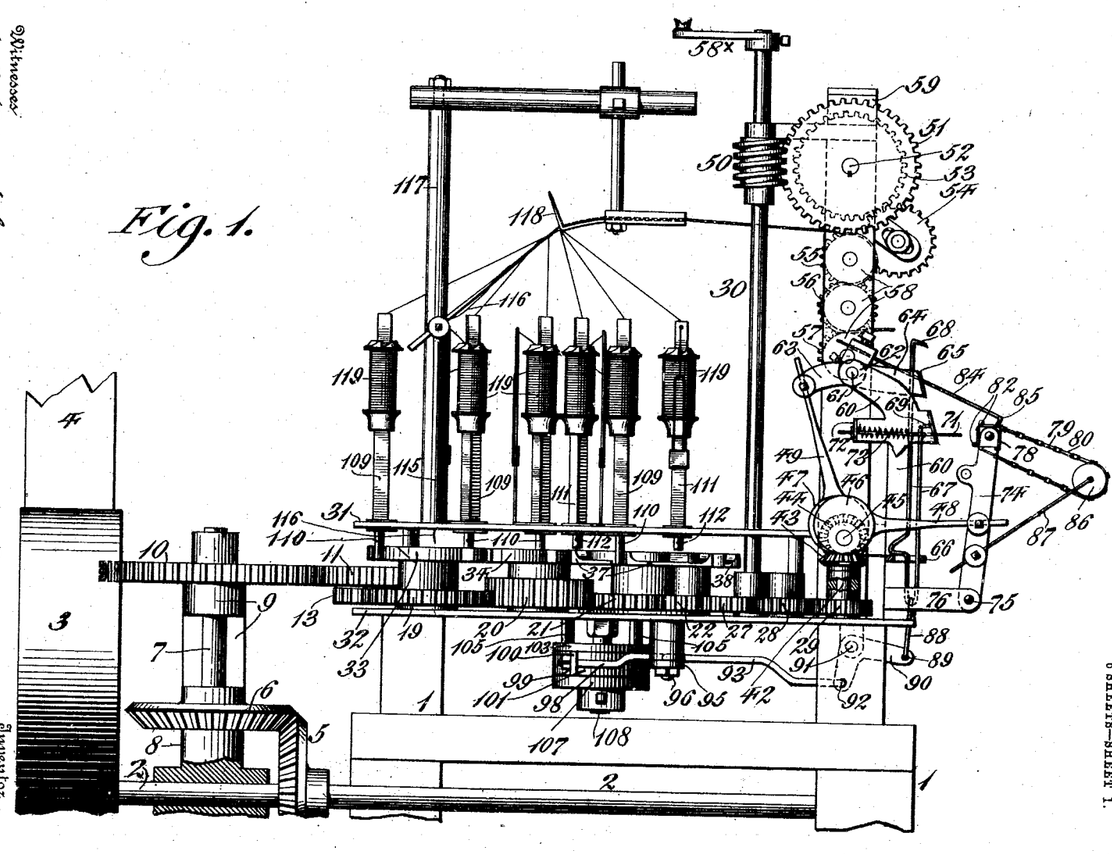
Figure 1 is a side elevation of a portion of the machine.
Figure 17:
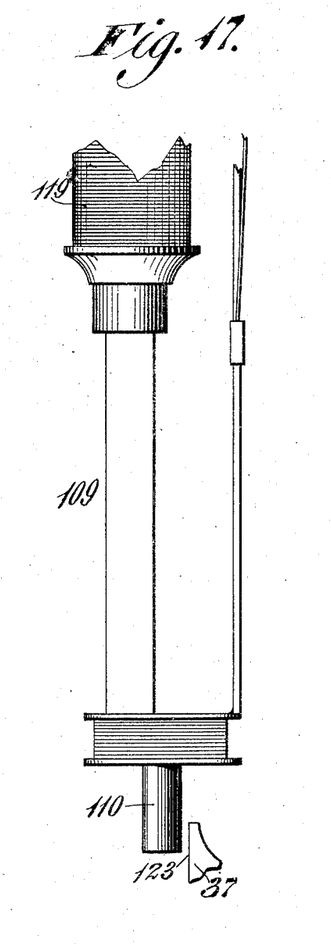

The bobbin-holders, carriers or racers 109 are provided at their lower extremities with the studs or pins 110, see Figs. 1 and 17, while the bobbin-holders, carriers or racers 111, seen in Figs. 1, 7, 8 and 16 are provided at their lower extremities with the studs or pins 112, it being noted that the studs 110 are longer than the studs 112 for a purpose hereinafter described.

Figure 2:
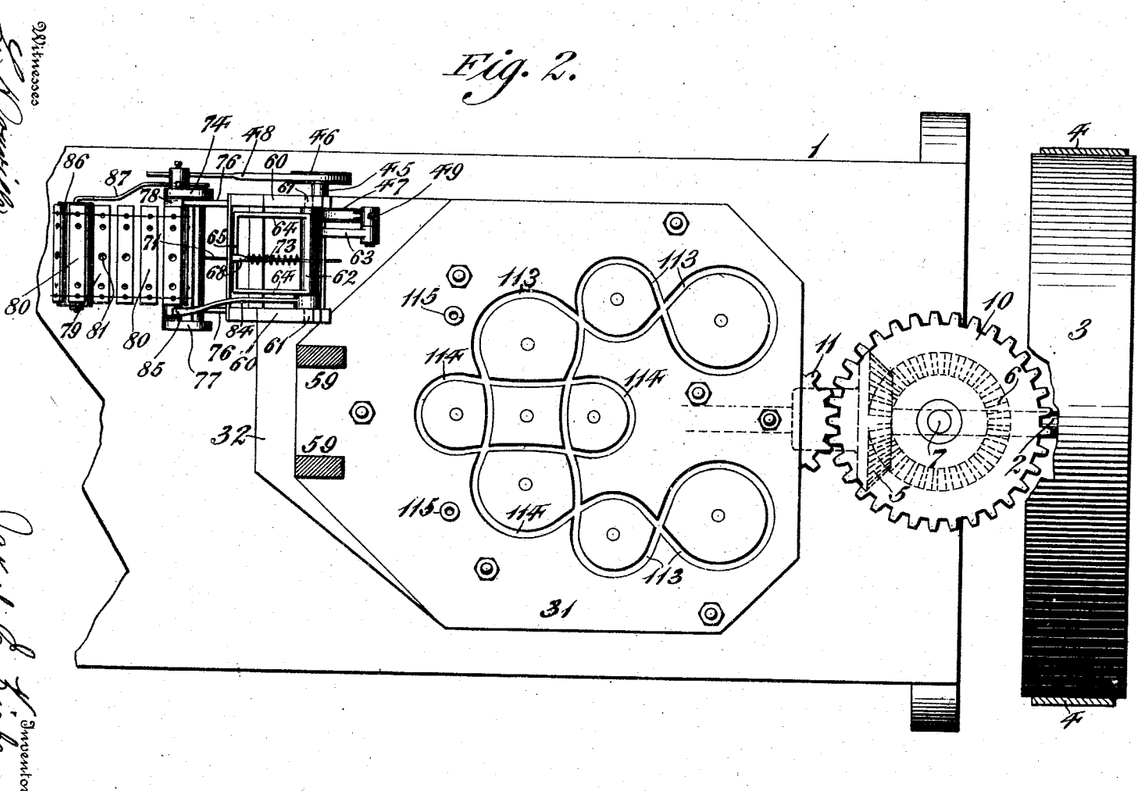
Fig. 2 is a plan view of certain of the parts seen in Fig. 1.

The plate 31 is provided with the race rings 113 and 114, see Fig. 2, in which are guided the bobbin-holders 109 and 111 in the usual manner. Rising from the plate 31 are the hollow needle posts 115 of usual construction and through which passes the warp threads 116 in the usual way and which is employed in making the loops at the edge of the braid. Rising from the plate 31 is a post 117 that is adapted to support the guide 118 for the various threads employed in the construction of the braid.

It is apparent that the capacity of the machine may be increased by an addition of bobbin-holders and slotted heads or wings and an extension or increase in the number of race rings without departing from the spirit of my invention, and therefore, I do not limit myself to the number of these parts, as illustrated in the accompanying drawings.

The operation is as follows:—The yarn from the various bobbins 119 are passed through the guide 118 and from the latter to the take-up rolls 58, after which the crank 58$^\times$ is operated whereupon motion is imparted to the machine, it being evident that, if desired, the machine may be driven by other means than by hand power. Assuming that the pulley 3 is rotating it is apparent that motion is imparted to the shaft 2 and consequently to the bevel gear wheels 5 and 6 and the spur gear 10, whereupon motion is transmitted to all the gear wheels throughout the system including the worm 50, seen in Fig. 1. The revolutions of certain of these gear wheels transmit motion to their respective slotted heads and consequently to the bobbin-holders 109 and 111 whose studs 110 and 112, respectively, are in engagement with said slotted heads, thereby causing the bobbin-holders to travel around in the guide rings 113 and 114. The studs 110 are of sufficient length to be acted upon by the slotted heads 33 to 40, both inclusive, while the machine is in operation whereupon it is evident that the bobbin-holders 109 are caused to travel in the race rings 113 and 114. In the case of the bobbin-holders 111, this is somewhat different. It will be noted on referring to Fig. 1, that the studs 112, that depend upon the bobbin-holders, by reason of their length, are out of the path of the rotating slotted heads 37, 38, 39 and 40 consequently said bobbin-holders remain stationary.

The card cylinder 78 is brought to and away from the needle 71 once to each revolution of the driving pulley 3. When one if a solid card 80 is brought up to the needle 71 the latter is pushed back and with it the hook 68 so that when the blade 65 is elevated by the rocking of the arms 64, due to the action of the eccentric 46, its rod 49 and the arm 63, no motion is imparted to the U shaped rod 67 and its adjuncts. When the cylinder 78 has reached a certain point in its travel toward the needle 71, the hook 85 drops and lies in the path of a projection 82. On the return or outward movement of the cylinder 78, the hook 85 is brought into engagement with a projection 82 and consequently imparts one fourth of a revolution to said cylinder so as to bring another card, which may be either, 79 or 80 in a position to be presented to the needle 71 in the manner hereinbefore described. When several cards 80 follow each other in succession the spool-holders 111 remain stationary while the spool-holders 109 are traveling in the race rings 113 and 114. When a perforated card 79 however is brought up to the needle 71, in the manner already explained, the perforation 81 therein receives the needle 71 and permits the latter to remain in its normal position as seen in Figs. 1, 9 and 15, it being noted that the needle 71 also enters an opening 83 in the cylinder 78, and that the perforation 81 and opening 83 are in alinement with each other. When the blade 65 is elevated, as hereinbefore described, said blade engages the hook 68 and lifts the U shaped bar 67 and link 88 whereupon the bell-crank lever 90 is turned upon its fulcrum 91 and thus exerts a pull on the rod 93 which latter in its turn causes the lever 95 to move in the direction indicated by the arrow in Fig. 14, whereupon the arm 100 turns the casing 101 in the direction indicated by the arrow in Fig. 10. This will cause the rollers 102 to pass under the inclined faces 104 in the disk 103 and elevate the latter, and consequently the rods 105 and plate 106, and the gear wheels and slotted heads supported on said plate.

Figures 5, 6, 7, 8:
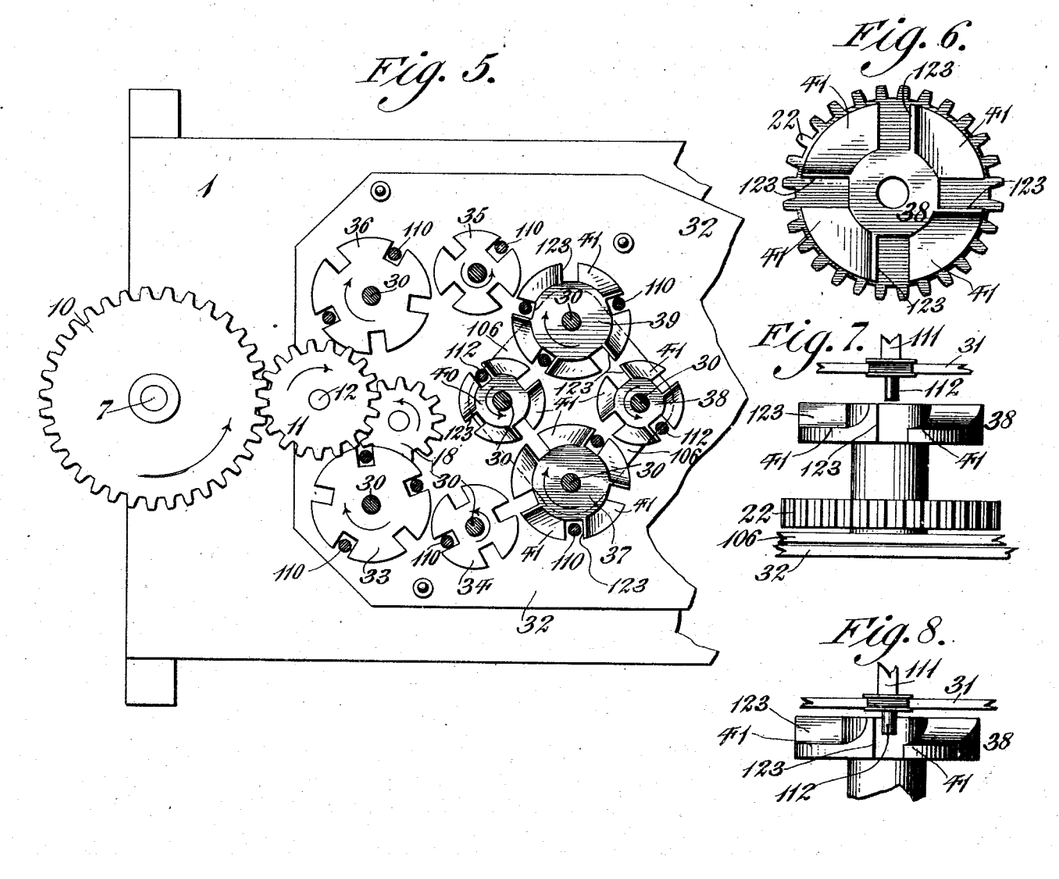
Fig. 5 is a plan view of certain detached portions of the machine.
Fig. 6 is a plan view of one of the slotted heads employed, and a gear wheel connected therewith, the same being on an enlarged scale.
Fig. 7 is a side elevation of the slotted head and gear wheel seen in Fig. 6 with the addition of certain detached portions of the machine.
Fig. 8 is a side elevation of certain of the parts seen in Fig. 7 and some of which are in different positions from the corresponding ones seen in Fig. 7.

In Fig. 7, the parts seen therein are in their normal positions and correspond to those of the similar parts seen in Fig. 1, it being noted that the studs 112 are out of the path of the slotted heads 37, 38, 39 and 40. Whenever a perforated card 79 is brought up to the needle 71 said needle enters a perforation 81 in said card and an opening 83 in the cylinder 78 as before explained whereupon the U bar 67 is elevated and lifts the plate 106 and the several parts supported thereon. The slotted heads 37, 38, 39 and 40 are then brought into their operative positions, one of said heads, viz., the head 38, seen in Fig. 8, being now in the position it occupies when the U shaped rod 67 is elevated. When the hook 69 reaches a point above the top edge of the plate 70, due to the upward movement of the U shaped rod 67, the spring 73 expands and moves said rod forward and causes the hook 69 to engage the plate 70 and thus retain the rod 67 in its elevated position, whereupon the slotted heads 37, 38, 39 and 40 impart motion to the bobbin-holders 111 so that these latter are brought into action with the bobbin-holders 109, and move around the ring 114. When several cards 79 follow each other in succession the bobbin-holders 111 remain in action during two or more revolutions of the driving pulley 3 or as many as may be desired. When a solid card 80 is brought up to the needle 71 it pushes the latter, against the resistance of the spring 73, and removes the hook 69 from its engagement with the plate 70 whereupon the weight of the plate 106 and the parts supported thereon depress the disk 103 and cause its inclined faces 104 to return the rollers 102 to their normal position as seen in Fig. 13, the several parts then occupying the positions seen in Figs. 1 and 9, whereupon the bobbin-holders 111 are no longer acted upon by the slotted heads 37, 38, 39 and 40 and consequently remain stationary.

It is apparent that a great variety of designs, of braids, may be produced by changing the order or arrangement of the cards 79 and 80.

When it is desired to stop the machine, the operator depresses the handle 120, of the lever 17, whereupon the clutch members 14 and 15 are brought into engagement with each other and the operation hereinbefore described is repeated.

The object of the curved recessed portions 41 in the slotted heads 37, 38, 39 and 40 is to permit said heads to be raised, as hereinbefore described, while the same are rotating and without bringing any portion thereof in contact with a stud 112 until a wall 123 in said heads is caused to abut against said stud, due to the rotation of said heads.

It is apparent that if the recessed portions 41 did not exist, or in other words, if the heads 37, 38, 39 and 40 were of uniform thickness, certain portions of the upper surface of said heads might strike the lowermost portions of the studs 112 before a slot in said heads is in proper position to receive a stud whereupon injury to the machine would occur.

Having thus described my invention, what I claim as new and desire to secure by Letters Patent, is:—

1. In a braiding machine, carriers in groups, and means whereby certain of said groups of carriers may be thrown as a whole into or out of operation.

2. In a braiding machine, a plurality of race ways carriers in groups, and means whereby certain of said groups of carriers may be thrown as a whole into or out of operation within a race-way.

3. In a braiding machine, carriers in groups and unitary means whereby certain of said groups of carriers may be thrown as a whole into or out of operation at predetermined intervals.

4. In a braiding machine, a set of carriers having operating pins, and a set of carriers having a different length operating pins from that of the first mentioned set of carriers and operative means for engagement with said pins for operating said carriers.

5. In a braiding machine, a set of carriers having operating pins, means for operating said carriers, a second set of carriers having operating pins of shorter length than those of the first mentioned set of carriers, and means normally out of engagement with the shorter pins and adapted to be moved at predetermined times to engage with said shorter pins for operating the same.

6. In a braiding machine, a set of carriers having operating pins, slotted heads for operating the same, means for actuating said heads, a second set of carriers, operating pins therein, of shorter length than the pins of said first mentioned set and slotted heads engaging the pins of said first mentioned carriers and adapted to be moved into engagement with the said shorter pins.

7. In a braiding machine, a set of carriers having operating pins, slotted heads for operating the same, means for actuating said heads, a second set of carriers, operating pins thereon of shorter length than the pins of said first mentioned set, slotted heads engaging the pins of the first mentioned carriers and normally out of engagement with the shorter pins and means for raising said second mentioned set of heads whereby they engage said shorter pins.

8. In a braiding machine, a set of carriers having operating pins, slotted heads for operating the same, means for actuating said heads, a second set of carriers, operating pins thereon of shorter length than the pins of said first mentioned set, slotted heads engaging the pins of the first mentioned carriers and normally out of engagement with the shorter pins, means for raising said second mentioned set of heads whereby they engage said shorter pins, and means for operating said second mentioned slotted heads in their raised or lowered position.

9. In a braiding machine, a plurality of carriers with operating pins, a plurality of carriers with shorter operating pins, a plurality of slotted heads all of which engage the operating pins of the first set of carriers and means for raising certain of said heads for engaging the shorter pins.

10. In a braiding machine, a plurality of carriers with operating pins, a plurality of carriers with shorter operating pins, a plurality of slotted heads all of which engage the operating pins of the first set of carriers, means for raising certain of said heads for engaging the shorter pins and means for actuating said heads.

11. In a braiding machine, carriers in groups, slotted heads which are normally out of engagement with certain of said groups of carriers while in engagement with the other groups, means for raising and lowering certain of said heads for causing the same to engage with and be removed from engagement with said certain groups of carriers whereby the same may be thrown as a whole into or out of operation, and means for actuating said raising and lowering means.

12. In a braiding machine, carriers in groups, slotted heads which are normally out of engagement with certain of said groups of carriers while in engagement with the others, means for raising and lowering certain of said heads for causing the same to engage with and be removed from engagement with said certain groups of carriers whereby the same can be thrown as a whole into or out of operation, and jacquard mechanism for actuating said raising and lowering means.

13. In a braiding machine, carriers, slotted heads for operating the same, a second set of carriers, slotted heads whereby said second set of carriers may be thrown as a whole into or out of operation, and means for actuating said second mentioned slotted heads at predetermined intervals.

14. In a braiding machine, carriers, slotted heads for operating the same, a second set of carriers, slotted heads whereby said second set of carriers may be thrown as a whole into or out of operation, and jacquard mechanism for actuating said second mentioned slotted heads at predetermined intervals.

15. In a braiding machine, carriers in groups, actuating means for said carriers and means for disconnecting certain of said groups as a whole from said actuating means whereby the same may be thrown as a whole into or out of operation within a race-way.

JAKOB EMIL KIRBERG.

Witnesses:
W. W. COLLADAY,
WM. CANER WIEDERSEIM.